(No Model.)
T. D. KEASEY.
PULLEY.
No. 436,582. Patented Sept. 16, 1890.
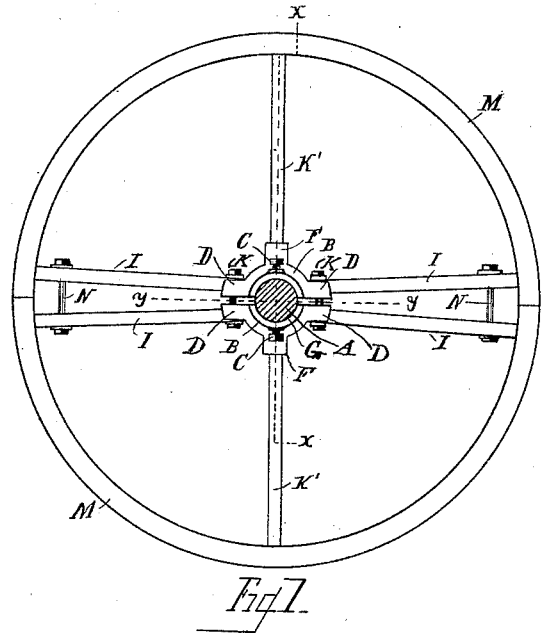
Fig. 1.
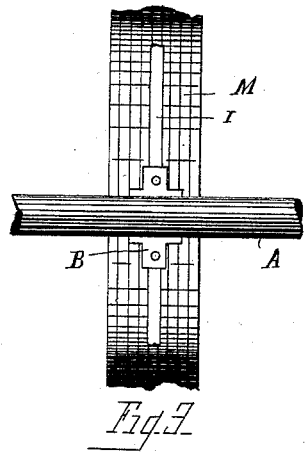
Fig. 3.
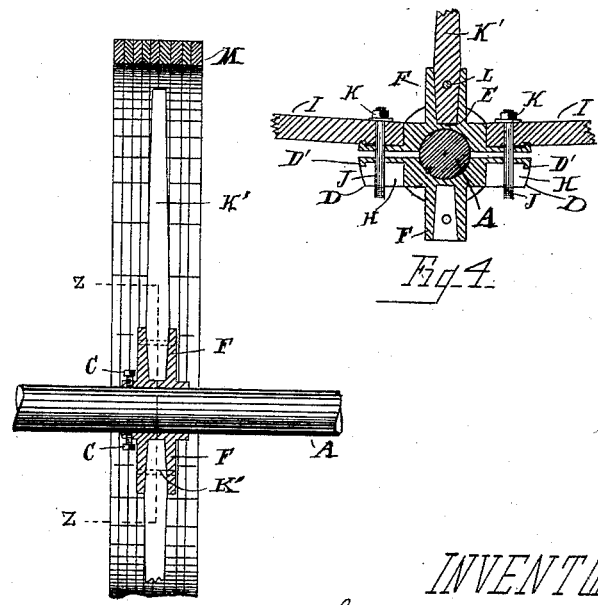
Fig. 2.
Fig. 4.
WITNESSES
Carroll J. Webster
Anna J. Lehaney
INVENTOR
Theron D. Keasey
By William Webster
Atty

UNITED STATES PATENT OFFICE.

THERON D. KEASEY, OF TOLEDO, OHIO.

PULLEY.

SPECIFICATION forming part of Letters Patent No. 436,582, dated September 16, 1890.

Application filed November 27, 1889. Serial No. 331,761. (No model.)

*To all whom it may concern:*

Be it known that I, THERON D. KEASEY, a citizen of the United States, and a resident of Toledo, in the county of Lucas and State of Ohio, have invented certain new and useful Improvements in Pulleys; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to pulleys, and has particular reference to that class generically known as "split pulleys," wherein the sections which comprise a complete pulley are separable to allow of adjustment to or removal of the shaft from its hangers.

The object of my invention is to construct a separable pulley by the use of two similarly-constructed metal hub-sections formed with recesses to receive spokes, which are secured firmly in place in the act of assembling the parts of the pulley. A further object is to simplify the construction and reduce the expense of manufacture of this class of pulleys. I attain these objects by the construction illustrated in the accompanying drawings, in which—

Figure 1 is a side elevation of a pulley constructed in accordance with my invention. Fig. 2 is a transverse section on lines $xx$, Fig. 1. Fig. 3 is a section on lines $yy$, Fig. 1; and Fig. 4 is a section on lines $zz$, Fig. 2.

A designates the shaft, upon which is clamped two similarly-constructed hub-sections B by means of set-screws C. Each hub-section B is formed with arms D at diametrically-opposite points from the central portion E of the section, and with a socket F, projecting at right angles to arms D, the central portion of the section being formed with a semicircular recess G, of a diameter to fit closely upon shaft A.

Each arm D is formed with a recess H, preferably rectangular, for the reception of spokes I of the wheel, the spoke being held in place by means of a bolt J passed therethrough and through a perforation in each of the parallel arms D, by which means when the bolt J is tightened by means of nut K upon the threaded ends thereof the spokes I are secured firmly within the recesses in the arms, and the act of tightening the nuts upon the arms draws the two sections together and clamps them upon the shaft.

Each arm D is formed with an upwardly-projecting flange D', which is embedded within the spoke I as tension is given to the spoke, thereby assisting in holding the spoke firmly in place.

K' designates spokes arranged at right angles to the spokes I, the tapered ends of which fit closely in the sockets F, and are further secured by bolts or rivets L.

M designates the rim of the pulley, preferably formed of segments of wood, between which the spokes are secured.

By reference to Figs. 1 and 4 it will be seen that the arms D incline slightly at their outer ends to incline the spokes I from a true radial line from the axial center of the pulley, thereby causing the outer ends thereof to enter the rim at one side of the diametric separation, thereby causing the periphery of the pulley to always assume a true circle when tension is put upon the upper and lower sides, respectively, of the upper and lower spokes I by means of bolts N passed through the same, the tension of bolts N drawing the spokes together, and thereby holding the semicircular sections of rim closely together.

In constructing the wood portion of the pulley, by reason of the detachability of the spokes I from the arms D, all of the spokes may be secured within the rim prior to their being secured to the hub-sections, thereby rendering it convenient to manufacture the same, and by reason of the hub-sections being exact duplicates the work of assembling the parts is greatly facilitated.

By the construction of hub-section described and shown the usual heavy and expensive flanges are dispensed with and the usual expensive fitting of parts obviated.

What I claim is—

In a band-pulley, metal hub-sections formed with sockets, arms at right angles thereto, each formed with a recess and having a transverse flange, the bases of the arms being inclined, in combination with spokes fitting within the sockets and held within the recesses by bolts passing through both hub-sections, as and for the purpose set forth.

In testimony that I claim the foregoing as my own I hereby affix my signature in presence of two witnesses.

THERON D. KEASEY.

Witnesses:
JAMES STRATTON,
CARROLL J. WEBSTER.